Figure 5:
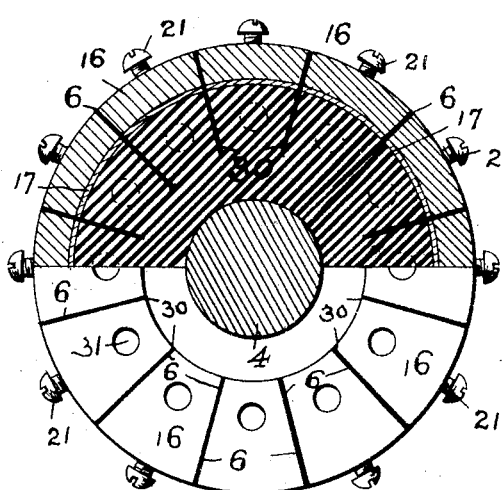

No. 784,521. PATENTED MAR. 7, 1905.
F. A. FELDKAMP.
COMMUTATOR FOR ELECTRIC MACHINES AND PROCESS OF MAKING SAME.
APPLICATION FILED APR. 16, 1901.
4 SHEETS—SHEET 1.
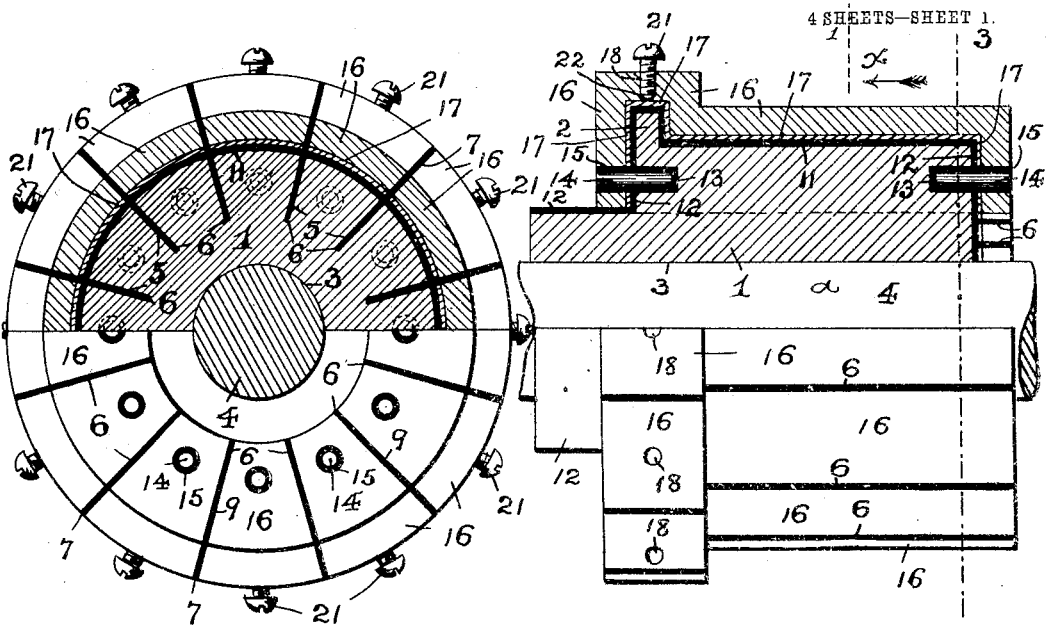
FIG.1
FIG.2
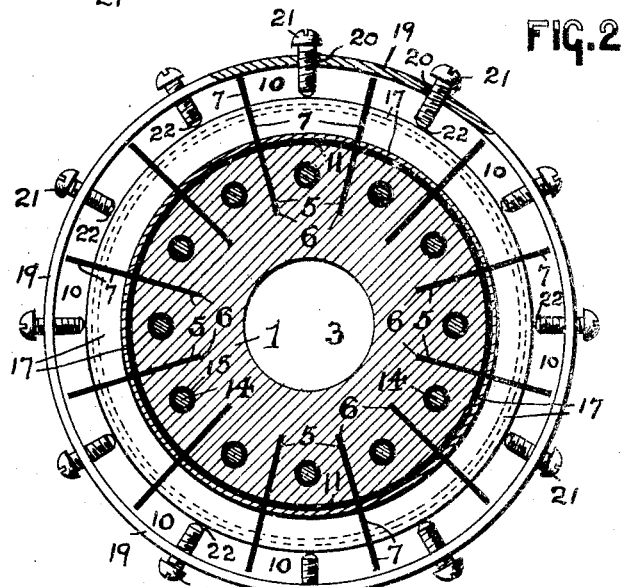
FIG.3
FIG.4
WITNESSES:
W. B. Frantzel
Geo. H. Richards
INVENTOR:
FRITZ A. FELDKAMP
BY
Fred'k C. Fraentzel,
ATTORNEY No. 784,521. PATENTED MAR. 7, 1905.
F. A. FELDKAMP.
COMMUTATOR FOR ELECTRIC MACHINES AND PROCESS OF MAKING SAME.
APPLICATION FILED APR. 16, 1901.

4 SHEETS—SHEET 2.

WITNESSES:

INVENTOR:
FRITZ A. FELDKAMP
BY
Fred C. Fraentzel,
ATTORNEY

No. 784,521. PATENTED MAR. 7, 1905.
F. A. FELDKAMP.
COMMUTATOR FOR ELECTRIC MACHINES AND PROCESS OF MAKING SAME.
APPLICATION FILED APR. 16, 1901.

4 SHEETS—SHEET 3.

WITNESSES:
W. B. Fraentzel.
Geo. D. Richards.

INVENTOR:
FRITZ A. FELDKAMP
BY
Fred'k C. Fraentzel,
ATTORNEY

No. 784,521. PATENTED MAR. 7, 1905.
F. A. FELDKAMP.
COMMUTATOR FOR ELECTRIC MACHINES AND PROCESS OF MAKING SAME.
APPLICATION FILED APR. 16, 1901.

4 SHEETS—SHEET 4.

WITNESSES:
N. B. Fraentzel
Geo. D. Richards

INVENTOR:
FRITZ A. FELDKAMP
BY Fred L. Fraentzel,
ATTORNEY

No. 784,521.

Patented March 7, 1905.

UNITED STATES PATENT OFFICE.

FRITZ A. FELDKAMP, OF NEWARK, NEW JERSEY.

COMMUTATOR FOR ELECTRIC MACHINES AND PROCESS OF MAKING SAME.

SPECIFICATION forming part of Letters Patent No. 784,521, dated March 7, 1905.

Application filed April 16, 1901. Serial No. 56,031.

*To all whom it may concern:*

Be it known that I, FRITZ A. FELDKAMP, a subject of the Emperor of Germany, residing at Newark, in the county of Essex and State of New Jersey, have invented certain new and useful Improvements in Commutators for Electric Machines and Processes of Making the Same; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention has reference to a novel construction of commutator for electric machines, such as dynamos and electric motors, and to a novel process or method of producing commutators and commutator-sections constructed according to the principles of this invention.

The invention has for its primary object the production of a novel and simple construction of commutator and a novel process or method of producing the same, combining in combination with a supporting core or base commutator-sections, said sections being electrolytically deposited upon the said core or base by the agency of dynamic electricity.

A further object of this invention is to simplify the general construction of commutators for electric machines and to cheapen the cost of manufacture of the same, dispensing with the necessity and requirement of accurately and minutely finishing or shaping, by means of expensive tools and machinery, the surfaces of the angular sides of the respective commutator-sections; furthermore, dispensing with the necessity of drilling and tapping holes in each commutator-section for the reception of the binding-screws employed in commutators, and, further, to provide the supporting core or base with suitable holding or retaining means of any desirable construction about which the commutator-sections are formed by the electrodeposition of the metal in position upon such core or base and against displacement therefrom by accident.

Other objects of this invention not at this time more particularly mentioned will be evident from the following detailed description of this invention.

This invention therefore consists, primarily, in the novel construction of commutator for electric machines, combining with a supporting core or base, which is of such construction that it can be placed upon an armature-shaft of a dynamo or other electric machine, any desirable number of commutator-sections, said sections being formed and secured in their operative positions upon the core or base by electrodepositing the metal from which each commutator-section is made between insulating-sections projecting from said core or base.

The invention consists, furthermore, in the novel process or method for producing commutator-sections and complete commutators by electrodeposition, and, furthermore, this invention consists in the several novel arrangements and combinations of the various parts, as well as in the details of the construction of such parts, all of which will be hereinafter more fully set forth and then embodied in the clauses of the claim.

The invention is clearly illustrated in the accompanying drawings, in which—

Figure 6:
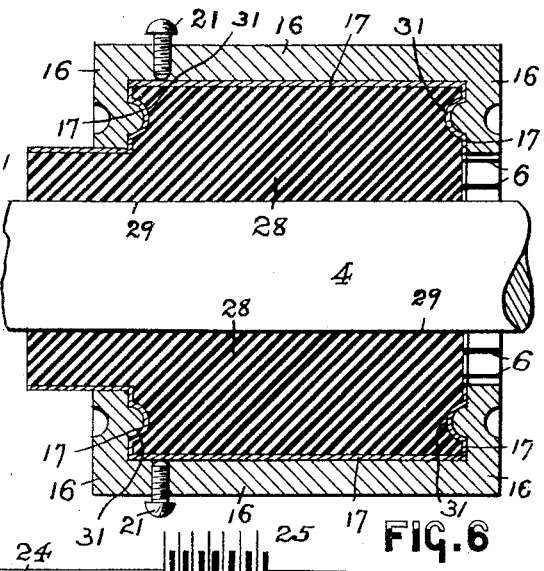
Figure 7:
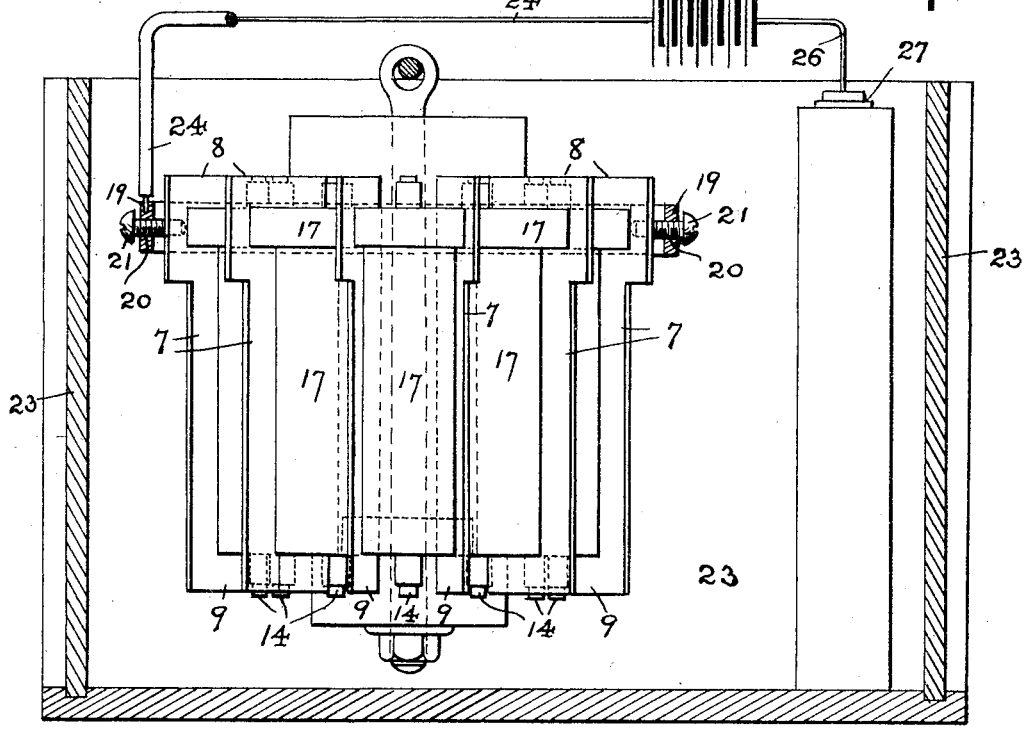
Figure 8:
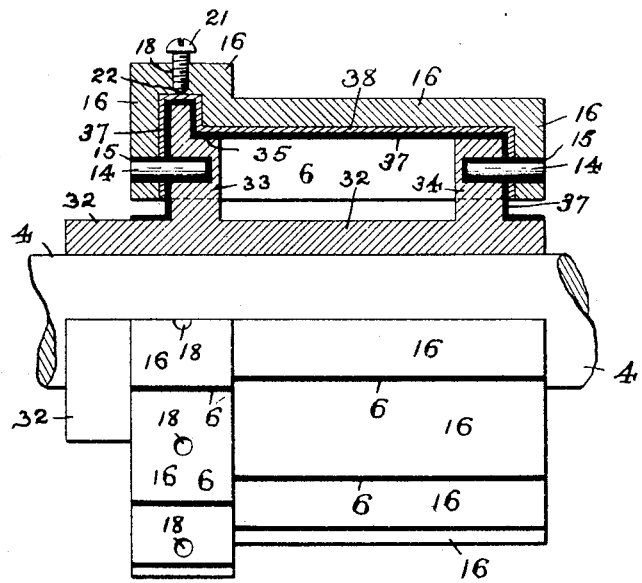
Figure 9:
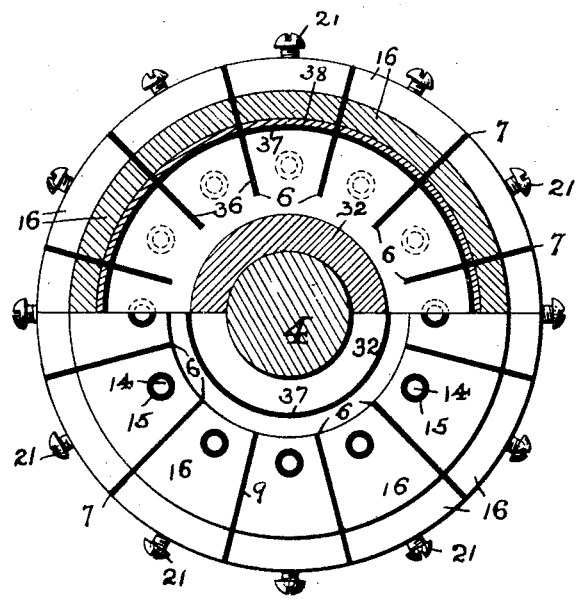
Figure 10:
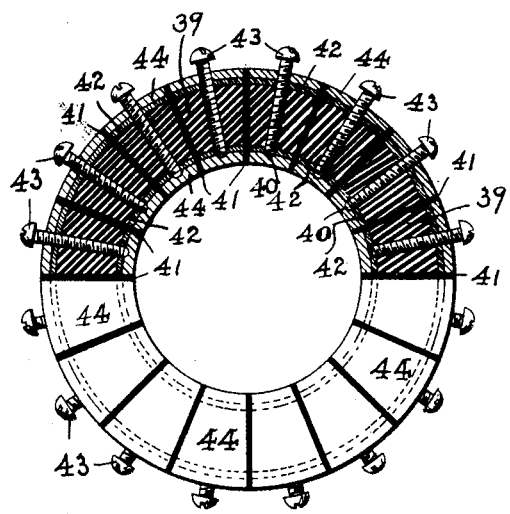
Figure 11:
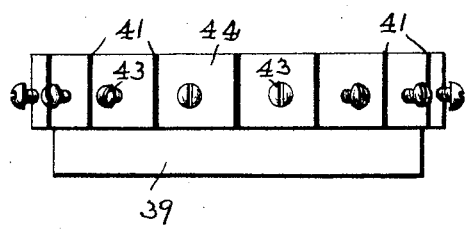
Figure 12:
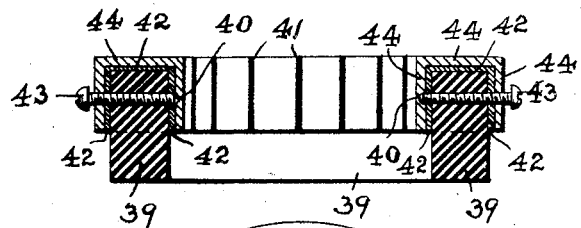
Figure 13:
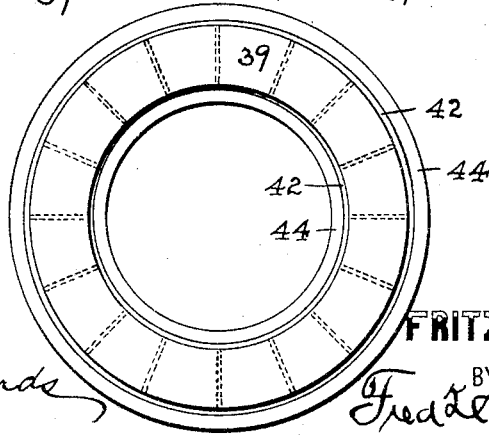

Figure 1 is a combined end view and vertical cross-section on line 1 in Fig. 2 looking in the direction of the arrow $x$ of one form of commutator construction embodying the principles of this invention, and Fig. 2 is a part side elevation and part longitudinal vertical section of the said commutator. Fig. 3 is a vertical cross-section of a metal supporting core or base, provided with suitably-disposed insulators or insulating-sections and one means for arranging the contact or binding-screws in their relative positions, said view also illustrating an arrangement of metallic contact film or surface, which is a good conductor of electricity, upon which the commutator-sections are to be formed by electrolytic deposition of the metal, the said view also illustrating the employment of an insulating material between the contiguous surfaces of the said core or base and the metallic contact-film. Fig. 4 is a face view of one of the insulator-sections. Fig. 5 is a part end elevation and part vertical cross-section of another form of commutator, which is made according to and embodies the various principles of this invention, the supporting core or base in this instance being made from an insulating material. Fig. 6 is a longitudinal vertical section of the said commutator represented in said Fig. 5. Fig. 7 is a sectional representation of any form of electrometallurgical apparatus provided with a solution of the metallic salt, in which is placed, as illustrated in side elevation and in any suitable manner, the combined supporting core or base and insulators or insulating-sections, the same providing a skeleton frame for electrolytically depositing upon said core or base and between the insulator-sections the respective commutator-sections. Fig. 8 is a part side elevation and part longitudinal vertical section of still another modified form and construction of commutator embodying the principal features of this invention; and Fig. 9 is a part end elevation and part vertical cross-section of the same, these two views representing the supporting core or base made from metal, as in the construction indicated in Figs. 1, 2, and 3. Fig. 10 is a part plan and part horizontal section of still another form of commutator made according to this invention. Fig. 11 is a side elevation of this form of commutator. Fig. 12 is a vertical section; and Fig. 13 is a bottom view of the said commutator, the screw connection in this view, however, having been omitted.

Similar characters of reference are employed in all of the said above-described views to indicate corresponding parts.

Referring to Figs. 1, 2, and 3 of the drawings, the numeral 1 indicates a suitable supporting core or base made from any suitable metal, preferably brass. This core or base may be of any desirable shape and configuration in outline, the core or base in said Figs. 1, 2, and 3, in this instance, being provided at the one end with an annular projection 2, as shown; but this not essential, and the said core or base may be of any other suitable shape, as will be clearly evident. The said core or base is formed with the usual and centrally-disposed tubular part or duct 3, whereby the said core or base, after the several commutator-sections have been formed, can be arranged and secured upon the armature-shaft 4 of an electric machine, such as a dynamo or motor or an electric ceiling-fan, as will be clearly evident. The said core or base 1 is formed with any desired number of longitudinally-extending slots or incisions 5, which extend, preferably, from end to end of the said core or base, as shown, and radiate toward or from points near the central axis of the said core or base, as will be seen when the core or base is viewed from either end. These slots or incisions extend any desired depth into the body of said core or base, and said grooves or incisions can be readily and quickly cut in any number or cores of bases, all placed upon a suitable mandrel in a milling or other suitable machine, at a very slight cost of manufacture. After the core or base has been provided with this arrangement of slots or incisions 5 pieces or sections 6, of mica or any other insulating material, preferably of the configuration represented in Fig. 4 when used with the core or base 1, illustrated in said Figs. 1, 2, and 3, are then arranged in the said slots or incisions in such a manner that the main portion of each section 6 will be retained or held in place in the body of the said core or base 1, and the parts 7 and ends 8 and 9 of the sections 6 will project, respectively, beyond the longitudinally-extending surface and the respective ends of the core or base the distance required, according to the thickness of each metal commutator-section desired. In this manner the core or base 1 is provided upon its longitudinally-extending surface, which is usually cylindrical, as represented in the drawings, and at its ends with suitably-formed receiving-pockets, as 10, corresponding in each case to the number of commutator-sections desired. Within each pocket 10, resting directly upon the exposed surface portions of the core or base 1, are other pieces or sections 11, of insulating material—such as mica, fiber, or the like—the exposed end surfaces of the core or base 1 also being covered with pieces or sections 12 of similar insulating material. In the construction of core or base represented in said Figs. 1, 2, and 3, the ends of said core or base are provided with suitable recesses or receiving-sockets 13, corresponding to the number of armature-sections, in each of which is placed a metallic pin 14, preferably of steel, the said pins being suitably incased in insulating material 15 and held in place by the frictional contact between the said parts. Each pin 14 projects at the one end from the end surface of the core or base 1, the said projecting portions of the pins extending through the insulating pieces or sections 12, as illustrated.

In order that the commutator-sections 16 may be electrolytically deposited or formed in the respective pockets 10, which surround the core or base 1, a conducting surface or film, as 17, is provided, the same being a good conductor of electricity. This conductor may be thin sheets of lead-foil or other suitable metal foil or sheets, or a thin film of graphite, or, in fact, any other suitable conductor of electricity may be employed which can be brushed or painted upon the various surfaces or may be applied in any other manner.

A suitable ring 19, of metal, which is provided with suitably-disposed screw-holes 20, is next provided with screws 21, the said screws being secured in place in the said holes 20 and having their inner screw ends extending the proper distance from the inner surface of the said ring that the said ends of the several screws can be readily slipped over any suitable part of the conducting-film 17, and, preferably, over that part of the film arranged over the annular projection or shoulder 2 of the said base or core 1. Prior to the arrangement of the said ring 19 with the screws 21 in position upon the film-coated core or base 1, as just stated, the said ring and the several screws, except their pointed end surfaces 22, are previously prepared or covered with a water and acid proof insulating-varnish.

The various devices and parts hereinabove described having been assembled in the manner clearly indicated in said Fig. 3, one or more of the skeleton frames thus made are suspended or otherwise arranged in any suitable form of electrometallurgical apparatus, as 23. (See Fig. 7 of the drawings.) This apparatus, which may be a tank of any size, is filled with a nearly-saturated solution of sulfate of copper, which is to be deposited as solid metallic sections upon the above-mentioned conducting-film 17. This illustration shows one arrangement of connecting the ring 19 with the end of a wire 24, attached to and connected with any suitable source of electrical energy, as a battery 25 or a plating-dynamo, and 26 indicates the other wire running from said source of electrical energy to the usual pole 27. In this manner a complete circuit for the electric current is established through the interior of the metal ring 19, the interior of the screws 21, and by means of their non-insulated points or end surfaces 22 electrical contact is established with the conducting film or surface 17, arranged in the various pockets of the core or base 1, as will be clearly understood. The copper solution is therefore deposited upon the said conductor-films 17, between the several parts 7 and the respective ends 8 and 9 of the insulating-sections 6, to any desired thickness, according to the width of the projecting portions of said insulating-sections 6, and a complete and efficient commutator will be provided having its copper commutator-sections 16 formed directly within the several pockets 10 and around the holding-pins 14 against any displacement. The several screws 21 are then unscrewed from the copper sections formed around their threaded portions and from the ring 19, whereby a screw-threaded hole 18 is left in each copper commutator-section, as illustrated in Fig. 2, into which the same screws 21 can be returned for the purpose of attaching the respective ends of the armature-wires of the electric machine to said screws after the outer cylindrical surface portions of the commutator-sections and the projecting edges of the insulating-sections 6 have been turned off or ground down. The commutator is now ready for securing it in its operative position upon the shaft 4 in the usual and well-known manner.

In lieu of the metal core or base 1 employed with the form of commutator illustrated in said Figs. 1, 2, and 3 a core or base 28 may be employed, the core or base itself being made from an insulating material, such as fiber, or other suitable non-conductor of electricity. This insulating core or base 28 has a central duct 29 for arranging it upon the armature-shaft 4 and is provided with slots or incisions 30, in which are placed the insulating pieces or sections 6, of mica or other insulating material, in the manner hereinabove described. In this construction of core or base 28 the sides are preferably provided with retaining or holding depressions 31, although the insulated holding-pins 14 may be used to advantage with this form and construction of base or core 1. The employment of the insulating-pieces 11 and 12 in the pockets 10, as hereinabove described, are dispensed with in this construction, and the conducting film or material 17 is arranged directly upon the several exposed portions of the said core or base 28. The copper commutator-sections 16 are electrolytically deposited within the said pockets 10 and around the screws 21 for the production of the complete commutator in precisely the same manner as described in connection with the construction represented in Figs. 1 and 2.

Another form of core or base for the commutator is that illustrated in Figs. 8 and 9 of the drawings. In this construction the core or base is made in the manner of a tube 32, provided with annular projections or shoulders 33 and 34, the said projections 33 being formed with an annular offset 35. Radially-extending slots 36 are made in the projections 33 and 34 for the placing therein of the insulating pieces or sections 6 hereinabove mentioned, having their portions 7 extending beyond the cylindrical surfaces of the projections 33 and 34 and having their ends 8 and 9 projecting from the outer faces of the said projections 33 and 34. Mica or other insulating pieces or sections 37 are placed in the manner illustrated in said Figs. 8 and 9, and upon these insulating pieces or sections 37 I have arranged the conducting-film 38 in the same manner represented in said Figs. 1, 2, and 3. Insulated holding-pins 14 may also be arranged in suitable sockets in the said annular projections 33 and 34, as illustrated. The copper commutator-sections 16 are then electrodeposited upon the film 38 and between the projecting portions of the insulating pieces or sections 6 and around the screws 21 in the manner above stated.

For smaller sizes of commutators, such as are ordinarily employed in ceiling and other electric fans, the commutator is constructed as illustrated in Figs. 10, 11, 12, and 13 of the drawings. In this construction the core or base 39 is a suitable ring, of fiber or other insulating material, provided in a portion thereof with slots or saw-cuts, in which are arranged insulating pieces or sections 41. In suitably-disposed screw-holes in the said core or base 39 are screws 43, having their free ends 40 projecting from the inner cylindrical surface of the ring-shaped core or base 39. A contact-film 42, of lead-foil or any other suitable material which is a good conductor of electricity, is arranged over the slotted end and partly down the outer and inner surfaces of the core or base 39 and between the edges of the mica or other insulating pieces or sections 41. These several parts are then placed in the electroplating solution of sulfate of copper in an electrometallurgical apparatus and the solid copper commutator-sections 44 formed in their proper positions upon said core or base.

From the above description of my invention it will be clearly seen that I have devised a novel construction of commutator for electric machines, and also a novel method or process of producing commutator-sections, by electrodeposition of the commutator-sections directly in position upon the core or base of the commutator, between the insulating pieces or sections which separate the adjacent commutator-section electrically from each other. By this novel process or method of producing commutators the construction is greatly simplified and the cost of manufacture greatly reduced, for there is no necessity of requiring skilled workmen in first accurately constructing the several commutator-sections, as heretofore, and then accurately and carefully fitting the several sections about a core or base. Furthermore, the employment of expensive machinery for finishing and shaping the annular surfaces of the long sides of each commutator-section, as heretofore, is fully obviated, and, furthermore, the drilling and tapping of screw-holes for the contact or binding screws and for connecting or holding bolts is also avoided.

The only actual manual labor required in the production of a commutator made according to my invention is the boring out of the core or base for placing it upon a shaft of an electric machine, the slotting of the said core or base, and the production of the insulating-pieces and the placing them in their respective positions upon the said core or base, and, finally, after the copper commutator-sections have been electrolytically deposited turning or grinding down the outer cylindrical surfaces of the commutator-sections and the projecting edges of the mica or other insulating material employed between the several commutator-sections.

I am fully aware that my invention is applicable to various forms and constructions of commutators. Hence I do not limit this invention to the exact arrangements and combinations of the parts as herein described, and illustrated in the accompanying drawings, nor do I confine myself to the details of the construction of any one or more of the said parts.

Having thus described my invention, what I claim is—

1. A commutator, comprising a core or base, and electrolytically-deposited commutator-sections on said core or base, each commutator-section comprising a main body portion extending laterally across the cylindrical face of the core, and downwardly-extending end portions forming integral parts with said main body portion, said end portions extending down the sides of the end faces of the core, and means on said end faces embedded directly in said end portions of said commutator-sections for preventing centrifugal displacement of said sections, substantially as and for the purposes set forth.

2. A commutator for electric machines, comprising, a core or base, insulating-sections extending from said core or base, electrolytically-deposited metal commutator-sections on said core or base and between the said insulating-sections, each commutator-section comprising a main body portion extending laterally across the cylindrical face of the core, and downwardly-extending end portions forming integral parts with said main body portion, said end portions extending down the sides of the end faces of the core, and means on said end faces embedded directly in said end portions of said commutator-sections, for preventing centrifugal displacement of said sections, substantially as and for the purposes set forth.

3. A commutator for electric machines, comprising, a core or base, having an arrangement of slots, insulating-sections held in said slots and extending from said core or base, and electrolytically-deposited commutator-sections on said core or base and between the said insulating-sections, and means for preventing centrifugal displacement of said sections, substantially as and for the purposes set forth.

4. A commutator for electric machines, comprising, a core or base, a conducting-film on said core or base, electrolytically-deposited metal commutator-sections on said film, each commutator-section comprising a main body portion extending laterally across the cylindrical face of the core, and downwardly-extending end portions forming integral parts with said main body portion, said end portions extending down the sides of the end faces of the core, and means on said end faces embedded directly in said end portions of said commutator-sections, for preventing centrifugal displacement of said sections, substantially as and for the purposes set forth.

5. A commutator for electric machines, comprising, a core or base, insulating-sections extending from said core or base, a conducting-film on said core or base, electrolytically-deposited metal commutator-sections on said film and between the said insulating-sections, each commutator-section comprising a main body portion extending laterally across the cylindrical face of the core, and downwardly-extending end portions forming integral parts with said main body portion, said end portions extending down the sides of the end faces of the core, and means on said end faces embedded directly in said end portions of said commutator-sections, for preventing centrifugal displacement of said sections, substantially as and for the purposes set forth.

6. A commutator for electric machines, comprising, a core or base, having an arrangement of slots, insulating-sections held in said slots and extending from said core or base, a conducting-film on said core or base, electrolytically-deposited metal commutator-sections on said film and between the said insulating-sections, and means for preventing centrifugal displacement of said sections, substantially as and for the purposes set forth.

7. A commutator for electric machines, comprising, a core or base, insulating-sections extending from said core or base, electrolytically-deposited metal commutator-sections on said core or base and between the said insulating-sections, and holding means connected with said core or base embedded in the said commutator-sections to prevent displacement of the said commutator-sections.

8. A commutator for electric machines, comprising, a core or base, electrolytically-deposited metal commutator-sections on said core or base, and holding means connected with said core or base embedded in the said commutator-sections to prevent displacement of the said commutator-sections.

9. A commutator for electric machines, comprising, a core or base, having an arrangement of slots, insulating-sections held in said slots and extending from said core or base, electrolytically-deposited metal commutator-sections on said core or base and between the said insulating-sections, and holding means connected with said core or base embedded in the said commutator-sections to prevent displacement of the said commutator-sections.

10. A commutator for electric machines, comprising, a core or base, a conducting-film on said core or base, electrolytically-deposited metal commutator-sections on said film, and holding means connected with said core or base embedded in the said commutator-sections to prevent displacement of the said commutator-sections.

11. A commutator for electric machines, comprising, a core or base, insulating-sections extending from said core or base, a conducting-film on said core or base, electrolytically-deposited metal commutator-sections on said film and between the said insulating-sections, and holding means connected with said core or base embedded in the said commutator-sections to prevent displacement of the said commutator-sections.

12. A commutator for electric machines, comprising, a core or base, having an arrangement of slots, insulating-sections held in said slots and extending from said core or base, a conducting-film on said core or base, electrolytically-deposited metal commutator-sections on said film and between the said insulating-sections, and holding means connected with said core or base embedded in the said commutator-sections to prevent displacement of the said commutator-sections.

13. A commutator for electric machines, comprising, a metal core, a film of non-conducting material on said core, a conducting-film on said non-conducting film, and electrolytically-deposited commutator-sections on said conducting-film, each commutator-section comprising a main body portion extending laterally across the cylindrical face of the core, and downwardly-extending end portions forming integral parts with said main body portion, said end portions extending down the sides of the end faces of the core, and means on said end faces embedded directly in said end portions of said commutator-sections, for preventing centrifugal displacement of said sections, substantially as and for the purposes set forth.

14. A commutator for electric machines, comprising, a metal core, having an arrangement of slots, insulating-sections held in said slots and extending from said core, sections of insulating material on the exposed surfaces of the core between said insulating-sections which extend from said slots, a conducting-film on said insulating material, electrolytically-deposited metal commutator-sections on said conducting-film and between said insulating-sections, and means for preventing centrifugal displacement of said sections, substantially as and for the purposes set forth.

15. A commutator for electric machines, comprising, a metal core, having an arrangement of slots, insulating-sections held in said slots and extending from said core, sections of insulating material on the exposed surfaces of the core between said insulating-sections which extend from the said slots, a conducting-film on said insulating material, electrolytically-deposited metal commutator-sections on said conducting-film and between said insulating-sections, and holding means connected with said core embedded in the said commutator-sections to prevent displacement of the said commutator-sections.

16. The method or process of producing commutator-sections by electrodeposition, which consists, in providing a core or base with radial slots, securing insulator-sections in said slots to provide receiving-pockets, lining the said pockets with films of conducting material, and electrodepositing the commutator-sections upon the films of conducting material, substantially as set forth.

17. The method or process of producing commutators, which consists, essentially, in providing a core or base with radial slots, securing insulator-sections in said slots to provide receiving-pockets, lining the exposed portions of said core or base in said pockets with a conducting-film, electrically connecting said film with a source of electrical energy, and electrodepositing commutator-sections upon said film in each pocket, substantially as set forth.

18. The method or process of producing commutators, which consists, essentially, in providing a core or base with pockets made from insulating material, lining the exposed portions of said core or base in said pockets with a conducting-film, placing insulated screws having non-insulated ends in contact with said conducting-film, electrically connecting said screws with a source of electrical energy, and electrodepositing the commutator-sections upon said film in each pocket and around the said screws, substantially as set forth.

19. The method or process of producing commutators, which consists, essentially, in providing a core or base with pockets made from insulating material, lining the exposed portions of said core or base in said pockets with a conducting-film, placing insulated screws having non-insulated end in contact with said conducting-film, electrically connecting said screws with a source of electrical energy, and electrodepositing the commutator-sections upon said film in each pocket and around the said screws, and then removing each screw from the deposited commutator-sections and providing thereby a screw-socket in each commutator-section, substantially as set forth.

20. The method or process of producing commutator-sections by electrodeposition which consists in providing a core or base with suitable holding devices, insulating said devices from said core or base, and then electrodepositing commutator-sections upon said core and about said holding devices that said holding devices will be embedded in portions of each commutator-section, substantially as set forth.

In testimony that I claim the invention set forth above I have hereunto set my hand this 15th day of April, 1901.

FRITZ A. FELDKAMP.

Witnesses:
FREDK. C. FRAENTZEL,
GEO. D. RICHARDS.